Sept. 19, 1961 M. O. REEVES 3,000,665
DESIGN AND ARRANGEMENT OF A CAB AND SLEEPER
COMPARTMENT FOR TRACTOR VEHICLES
Filed June 17, 1960 4 Sheets-Sheet 1

INVENTOR.
MARVIN O. REEVES
BY M. Y. Charles
ATTORNEY.

Sept. 19, 1961     M. O. REEVES     3,000,665
DESIGN AND ARRANGEMENT OF A CAB AND SLEEPER
COMPARTMENT FOR TRACTOR VEHICLES
Filed June 17, 1960     4 Sheets-Sheet 2

INVENTOR.
MARVIN O. REEVES
BY M. Y. Charles
ATTORNEY.

Sept. 19, 1961 M. O. REEVES 3,000,665
DESIGN AND ARRANGEMENT OF A CAB AND SLEEPER
COMPARTMENT FOR TRACTOR VEHICLES
Filed June 17, 1960 4 Sheets-Sheet 3

INVENTOR.
MARVIN O. REEVES
BY M. Y. Charles
ATTORNEY.

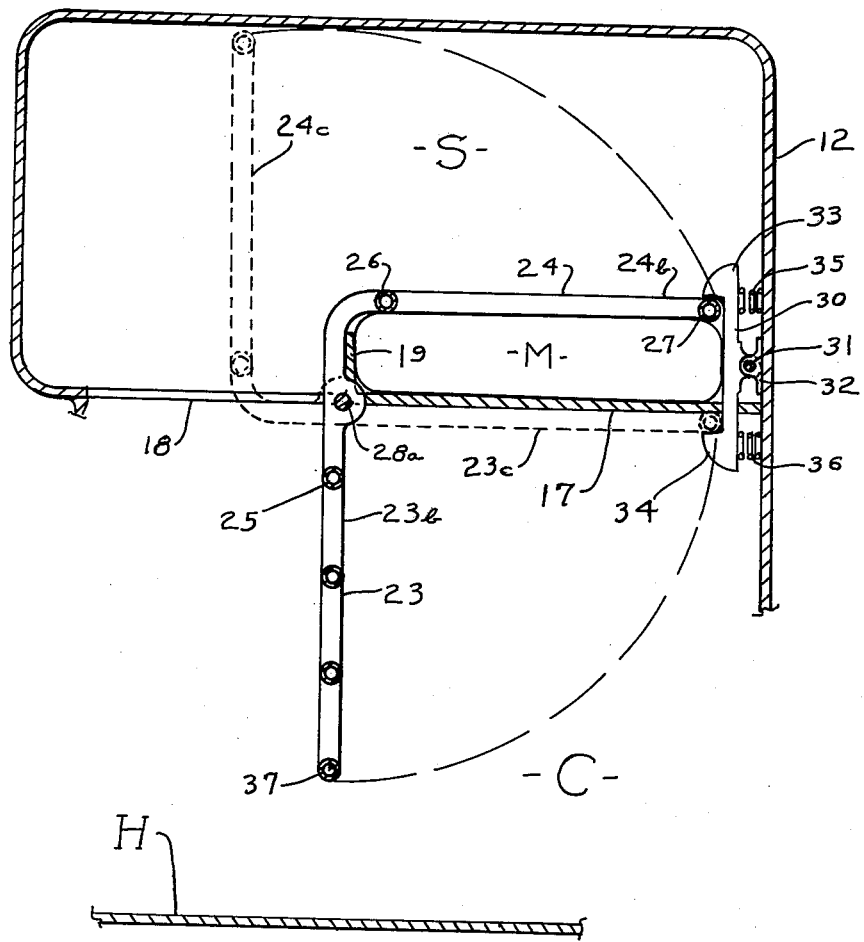

United States Patent Office 3,000,665
Patented Sept. 19, 1961

3,000,665
DESIGN AND ARRANGEMENT OF A CAB AND SLEEPER COMPARTMENT FOR TRACTOR VEHICLES
Marvin O. Reeves, 2612 E. 9th St., Wichita, Kans.
Filed June 17, 1960, Ser. No. 36,858
3 Claims. (Cl. 296—24)

My invention relates to an improvement in the design and arrangement of a cab and sleeper compartment for tractor vehicles.

Another object of the invention is to provide a cab and sleeper compartment arrangement so constructed and arranged on the tractor that a trailer of longer length than usual can be used in connection with the tractor and carry an increased pay load, without exceeding the allowable lineal dimension of the tractor and trailer prescribed by the State laws in which the tractor and trailer is to be used.

A still further object of the invention is to provide a device of the kind mentioned in which maximum loads may be carried without exceeding the allowable load limit on any of the wheels of the tractor or trailer.

Another object of the invention is to provide a device of the kind mentioned in which the sleeping compartment is roomy and comfortable and one which can be easily ventilated and air conditioned.

A still further object of the invention is to provide a device of the kind mentioned in which the location and arrangement of the sleeping compartment offers the maximum safety in the event of accidents and wrecks.

A still further object of the invention is to provide a device of the kind mentioned in which ingress and egress of the sleeping compartment is easy and occupies a minimum amount of space.

These and other objects of the invention will be more fully described as this description progresses.

Now referring to the accompanying drawings in which similar numerals of reference designate the same parts throughout all of the several figures of the drawings.

FIG. 4 is a detail, cross sectional view of the cab ceiling and sleeping compartment door and illustrates the ladder mechanism employed in entering and leaving the sleeping compartment, the view being as seen from the line IV—IV in FIG. 3 and looking in the direction of the arrows.

Figure 1:
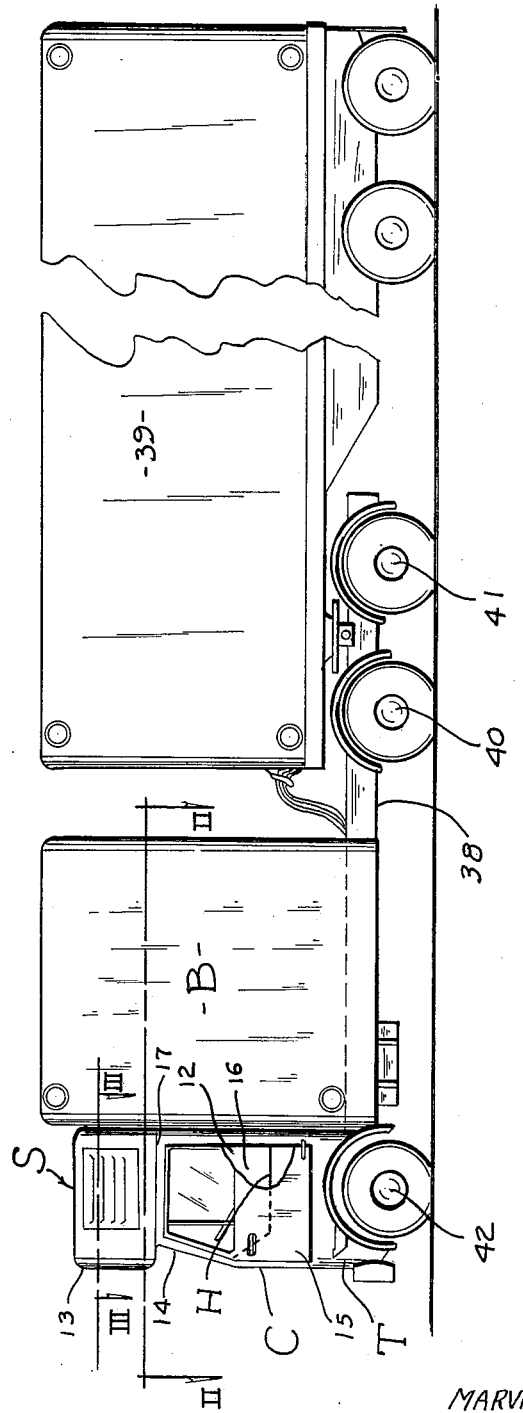
FIG. 1 is a side view of the tractor, embodying my freight bogie and a semi-trailer, parts of which are removed for convenience of illustration.
Figure 2:
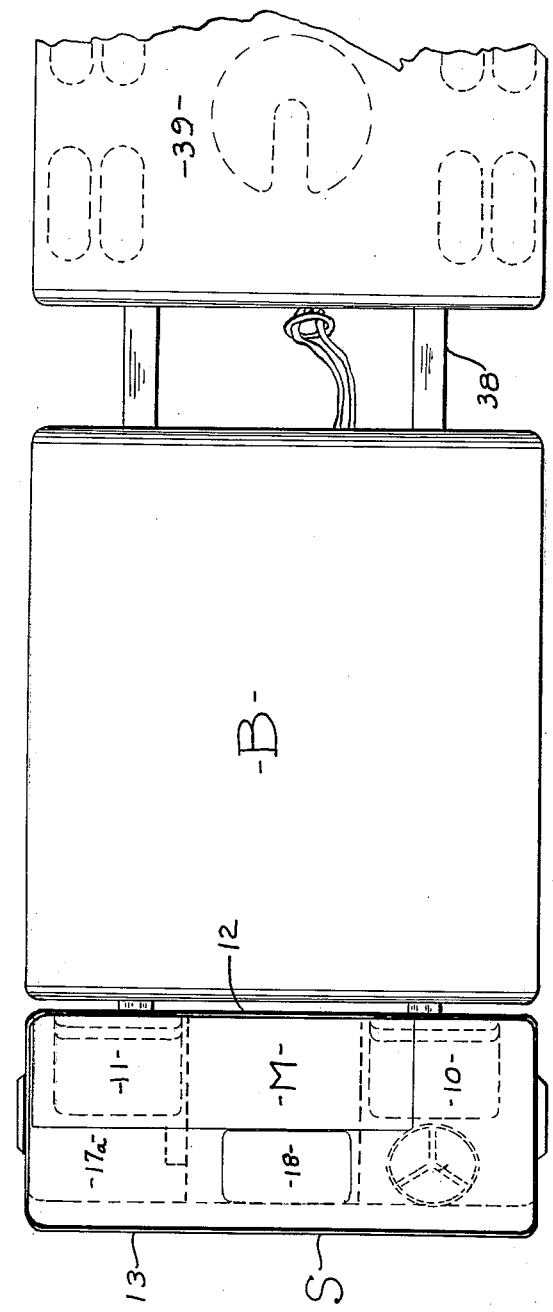
FIG. 2 is a horizontal, sectional view through the sleeper and bogie portion of the device, the view being as seen from the line II—II in FIG. 1 and looking in the direction of the arrows.
Figure 3:
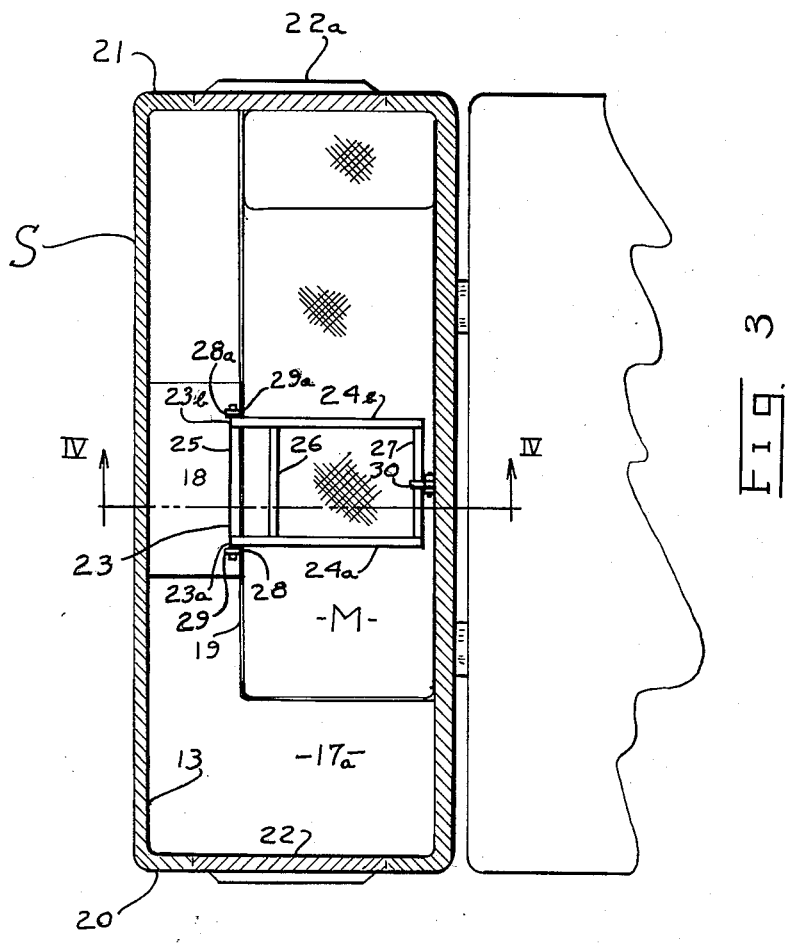
FIG. 3 is an enlarged, sectional view through the sleeper compartment, the view being as seen from the line III—III in FIG. 1 and looking in the direction of the arrows.

In the drawings is shown a tractor T having a cab C mounted well forward on the tractor and covering the tractor engine housing H which is positioned centrally in the cab C and extends rearwardly between the driver's seat 10 and the helper's seat 11, these seats being spaced well apart as shown in FIG. 2 to make room for the engine housing H as shown.

The cab is provided with a sleeping compartment S which is located above the seats 10 and 11 and the engine housing H and is between the rear wall 12 of the cab and the front wall 13 of the sleeping compartment which is directly over the windshield 14 of the cab.

The cab is provided with two doors, 15 and 16 for ingress and egress of the cab. The door 15 having parts broken away so as to show a portion of the door 16 on the opposite side of the cab.

The ceiling 17 of the cab C forms the floor of the sleeping compartment S and the ceiling structure has a man-hole or opening 18 therein that is located over the engine housing H and adjacent the front wall 13 of the sleeping compartment S.

The sleeping compartment S is provided with a mattress M that lays on the upper side of the cab ceiling structure 17, the upper side of which is considered as the floor 17a of the sleeping compartment S.

The floor 17a of the sleeping compartment S is provided with an upturned rail or flange 19 that extends all of the way therearound and serves to hold the mattress M in place on the floor 17a of the sleeping compartment S.

The end walls 20 and 21 of the sleeping compartment S are each provided with adjustable louvered panels 22 and 22a that are pressed into openings therefor and in case of an accident where an exit other than the man-hole 18 would be necessary, a person in the compartment S could easily kick out either panel 22 or 22a or the panels could be pulled out from the outside to provide a sufficient sized escape opening for a person in the compartment S to escape or be removed.

The device is further provided with a combination ladder 23 and man-hole barricade element 24. As shown in the drawings the combination ladder and barricade element 24 are made in an L-shape, having tubular L-shaped side elements that are spaced apart and having ladder rungs 25 spaced apart and positioned therebetween and the ends of the rungs being welded to the ladder legs 23a and 23b to form the ladder 23, which may be used to climb into and out of the sleeping compartment S.

The barricade element 24 comprises a continuation of the ladder legs 23a and 23b and extend rearwardly and at right angles to the ladder legs 23a and 23b. The barricade rungs 26 and 27 are fitted between the barricade legs 24a and 24b and are welded thereto to make a rigid frame.

The ladder legs 23a and 23b are pivotally mounted at points 28 and 28a in hinge brackets 29 and 29a that are rigidly attached to the ceiling 17 to hold the ladder and barricade element 23—24 in a swingable position, whereby the ladder 23 and the barricade 24 may alternately be placed in a vertical and horizontal position so that the barricade 24 will lay flat on the mattress and when the ladder 23 is in a vertical position and the barricade 24 will stand vertically along the inside edge of the manhole 18 when the ladder 23 is positioned horizontally again the ceiling 17 of the cab C as indicated by the dotted lines 24c and ladder 23c.

The device is further provided with a holder and stabilizer catch 30 for catching and holding the ladder and barricade 23 and 24 in the two positions above described.

The object of the barricade 24 is to keep a sleeper in the sleeping compartment S from being thrown forward and falling through the manhole 18 in the case of a quick stop of the vehicle.

The object of folding the ladder 23 rearwardly and up against the ceiling 17 of the cab C is to remove the ladder 23 from any sideways line of vision.

The catch 30 is substantially C-shaped and is positioned at the rear of the sleeping compartment S and is pivotally hung, substantially at its mid-portion at the point 31, in a supporting bracket 32 provided therefor. The supporting bracket 32 is rigidly affixed to the rear wall 12 of the cab C so as to support the upper portion of the C-catch 33 above the mattress M. The lower hook portion 34 of the C-catch is positioned below the ceiling 17 of the cab C.

When the bottom rung of the ladder 23 strikes the curved or sloping forward edge of the C-hook 34, the latch element 30 will be pushed rearwardly until the ladder rung 37 moves above the end of the C-hook portion 34, whereupon the compression spring 36 will rock the latch element 30. The hook portion 34 is positioned under the ladder rung 37 so as to hold the ladder 23 horizontally against the cab ceiling 17, and also hold the barricade 24 in a vertical position at the rear edge of the manhole 18.

Now to place the ladder in a vertical position for use and to place the barricade in a horizontal position so that it is out of the way, the latch element 30 may be rocked by hand either from within the cab C or the sleeping compartment S, to rock the hook 34 from under the ladder rung 37. Now therefore the combination ladder and barricade element 23—24 may be rocked so that the ladder 23 is in a vertical position and the barricade 24 is in a horizontal position and resting on the mattress M. As the barricade comes to this position, the upper rung 27 will strike the forward curved or sloping edge portion of the latch hook element 33, and rock the upper end of the latch element 30 rearwardly against the pressure of the compression spring 35, until such time as the barricade rung 27 has moved downwardly sufficiently that the compression spring 35 can again rock the latch element 30 to its vertical position. The latch hook 33 then will move over the barricade rung 27 and lock the combination ladder and barricade element 23—24 in the position just described and shown in full lines in FIG. 4.

The construction and location of the cab C on the frame 38 of the tractor T makes it possible to advance the load carrying point of the front end of the semi-trailer 39 further ahead of the rear axle 40—41 of the tractor T and toward the front axle 42 of the tractor T. This permits the semi-trailer 39 to be built in an increased length which increases the load capacity of the semi-trailer 39. Because of its point of bearing on the tractor, more of the load is distributed to the front wheels of the tractor which lightens some of the load on the rear wheels of the tractor and also lightens some of the load on the rear wheels of the semi-trailer 39, this means that an increased load may be put in the semi-trailer; the increased load can be carried without going over the wheel load limit prescribed by many of the State laws.

Many of the State laws limit the length of a semi-trailer that can be used in their State, and in order to comply with this limit, it develops there is much lost space between the front end of the semi-trailer and the back of the tractor cab and in order to make use of this space, the tractor and semi-trailer manufacturers have built what is known as a bogie, as shown at B, that is supported on the tractor cab and the front end of the semi-trailer. This bogie amounts to a load carrying space and quite often increases the pay load capacity of the tractor and semi-trailer outfit.

Therefore it is desirable to have as large a bogie as possible. At present, practically all of the tractor cabs have a sleeping compartment, either behind the seats of the cab or outside and behind the cab itself, and this is known as a "Sleeperette," but this design occupies lineal space of the outfit which would be desirable to use in an increased size bogie. Therefore in my improved design and arrangement herein shown and described, the sleeping compartment is arranged above the tractor cab and the space the sleeping compartment has normally occupied can, under my improved invention, be given to an increased sized bogie which increases the capacity of the pay load that can be handled by the tractor and semi-trailer outfit.

Now having fully shown and described my invention, what I claim as new and desire to secure by Letters Patent is:

1. A combination tractor cab and sleeping compartment for a tractor having an engine housing on the front portion thereof; said tractor cab being positioned over the engine housing and having two seats therein, positioned one on either side of the engine housing and door means in opposite sides of the cab and adjacent each of said seats for entrance into and exit from the cab; and having a sleeping compartment thereover, said cab and sleeping compartment having a continuous back wall and having side and end walls and a roof therefor; a division between the cab and the sleeping compartment; said division being a combination ceiling for the cab and floor for the sleeping compartment and upwardly extending means around the division for retaining a mattress on the floor of the sleeping compartment; said division having a manhole therein for passage into and out of the sleeping compartment; a combination ladder element and barricade element being integrally joined together and the two elements being positioned at 90 degrees to each other; said elements being hingedly hung adjacent their point of joinder to said division adjacent one edge of the manhole so that when the ladder element is in a vertical position the barricade element will lay in a horizontal position adjacent the floor of the sleeping compartment and when the ladder element is swung to a horizontal position the barricade element assumes a vertical position along the edge of the manhole as a protection against a sleeper in the sleeping compartment from falling through the manhole.

2. A combination tractor cab and sleeping compartment for a tractor having the structure, parts and arrangement thereof as defined in claim 1; the walls of said sleeping compartment having ventilating means therein; the ventilating means in the end walls being in panels; said panels being removable from the walls by pressure such as would be exerted from the hands or foot of an occupant of the sleeping compartment.

3. A combination tractor cab and sleeping compartment for a tractor having the structure, parts and arrangement thereof as defined in claim 1; latch means; said latch means being spring actuated for the purpose of receiving and holding the said ladder and barricade elements in either one of the afore-mentioned positions; said latch element being operable either from within the cab or within the sleeping compartment to release the combination ladder and barricade elements for the changing of the said ladder and barricade elements from one of their above mentioned positions to the other mentioned position and holding the combination ladder and barricade elements in its newly placed position.

References Cited in the file of this patent
UNITED STATES PATENTS 2,267,509    Strong _____ Dec. 23, 1941
2,783,080    Ringsby _____ Feb. 26, 1957